(12) United States Patent
Zhuang et al.

(10) Patent No.: US 12,742,930 B2
(45) Date of Patent: Sep. 22, 2026

(54) OPTICAL PHASED ARRAY DEVICE AND METHOD OF MANUFACTURE

(71) Applicants: The Regents of the University of Michigan, Ann Arbor, MI (US); Yangzhou Qunfa Heat Exchanger Co. Ltd., Yangzhou (CN)

(72) Inventors: Yating Zhuang, Yangzhou (CN); Dachuan Wu, Ann Arbor, MI (US); Ya Sha Yi, Troy, MI (US)

(73) Assignees: The Regents of the University of Michigan, Ann Arbor, MI (US); Yangzhou Qunfa Heat Exchanger Co. Ltd., Yangzhou (CN)

( * ) Notice: Subject to any disclaimer, the term of this patent is extended or adjusted under 35 U.S.C. 154(b) by 110 days.

(21) Appl. No.: 18/460,512

(22) Filed: Sep. 1, 2023

(65) Prior Publication Data

US 2024/0077671 A1 Mar. 7, 2024

Related U.S. Application Data

(60) Provisional application No. 63/403,202, filed on Sep. 1, 2022.

(51) Int. Cl.
*H04B 10/00* (2013.01)
*G02B 6/12* (2006.01)
(Continued)

(52) U.S. Cl.
CPC ......... *G02B 6/12009* (2013.01); *G02B 6/125* (2013.01); *G02B 6/13* (2013.01); *G01S 7/4817* (2013.01); *G02B 2006/12142* (2013.01)

(58) Field of Classification Search
CPC ...... G02B 6/12009; G02B 6/125; G02B 6/13; G02B 2006/12142; G02B 2006/12164;
(Continued)

(56) References Cited

U.S. PATENT DOCUMENTS 5,093,747 A * 3/1992 Dorschner .............. G02F 1/292 359/315
5,233,673 A * 8/1993 Vali ....................... G02F 1/2955 385/27

(Continued)

FOREIGN PATENT DOCUMENTS

| CN | 113850011 A | 12/2021 |
|---|---|---|
| CN | 108398842 B | 1/2024 |
| WO | 2023086513 A1 | 5/2023 |

OTHER PUBLICATIONS

International Search Report corresponding to application PCT/US2023/073378, dated Jan. 4, 2024, 4 pages.

(Continued)

*Primary Examiner* — Agustin Bello
(74) *Attorney, Agent, or Firm* — Reising Ethington P.C.

(57) ABSTRACT

An optical phased array device and method for manufacturing an optical phased array for the optical phased array device. The method includes: forming a base layer of a waveguide array on a base substrate, determining a waveguide pattern defining a plurality of waveguide paths, and fabricating a pattern layer of the waveguide array on top of the base layer of the waveguide array according to the determined waveguide pattern. The plurality of waveguide paths branch from a common path and terminate at a plurality of edge emitters, where the plurality of edge emitters are spaced apart from one another along a first axis that extends in the first dimension along an edge of the optical phased array. The spacing of multiple ones of the plurality of emitters along the first axis is aperiodic.

19 Claims, 8 Drawing Sheets

(51) Int. Cl.

| | |
|---|---|
| ***G02B 6/125*** | (2006.01) |
| ***G02B 6/13*** | (2006.01) |
| *G01S 7/481* | (2006.01) |

(58) Field of Classification Search

CPC ..... G02B 6/4215; G01S 7/4817; G01S 17/42; G01S 17/931

See application file for complete search history.

(56) References Cited

U.S. PATENT DOCUMENTS

| | | | | |
|---|---|---|---|---|
| 5,943,159 | A * | 8/1999 | Zhu | G02F 1/292 359/254 |
| 6,157,755 | A * | 12/2000 | Brauch | H01S 5/4025 385/38 |
| 6,400,871 | B1 * | 6/2002 | Minden | H01S 3/1307 385/39 |
| 6,469,822 | B1 * | 10/2002 | Zhu | G02F 1/292 359/578 |
| 7,391,954 | B1 * | 6/2008 | Castonguay | G02B 6/3885 385/140 |
| 7,454,091 | B2 * | 11/2008 | Chiaretti | G02F 1/2955 385/14 |
| 8,988,754 | B2 | 3/2015 | Sun et al. | |
| 9,081,252 | B2 * | 7/2015 | Aflatouni | G02F 1/025 |
| 9,476,981 | B2 | 10/2016 | Yaacobi et al. | |
| 9,557,585 | B1 * | 1/2017 | Yap | H01L 21/76879 |
| 9,726,818 | B1 * | 8/2017 | Yap | G02F 1/2955 |
| 10,345,518 | B1 * | 7/2019 | Yap | G01S 13/4463 |
| 10,365,536 | B1 * | 7/2019 | Jenkins | G01S 17/02 |
| 10,591,802 | B2 * | 3/2020 | Sun | G02F 1/2955 |
| 10,613,410 | B2 * | 4/2020 | Hosseini | G02F 1/292 |
| 11,456,532 | B2 * | 9/2022 | Khachaturian | H01Q 21/0087 |
| 11,564,565 | B2 * | 1/2023 | Hu | G02B 27/106 |
| 11,662,643 | B2 | 5/2023 | Lipson et al. | |
| 11,693,292 | B2 * | 7/2023 | Handanhal Ramachandra | G02F 1/295 385/10 |
| 11,940,621 | B2 * | 3/2024 | Watts | G02B 27/0087 |
| 11,947,044 | B2 * | 4/2024 | Behroozpour | G02F 1/0134 |
| 12,061,407 | B2 * | 8/2024 | Yi | G01S 7/4818 |
| 2015/0147027 | A1 * | 5/2015 | Bolle | G02B 6/2938 385/17 |
| 2017/0371227 | A1 * | 12/2017 | Skirlo | G02F 1/2955 |
| 2018/0039154 | A1 * | 2/2018 | Hashemi | G02F 1/2955 |
| 2018/0188452 | A1 * | 7/2018 | Sun | G01S 17/42 |
| 2018/0217258 | A1 * | 8/2018 | Hirasawa | G01S 17/86 |
| 2020/0225558 | A1 * | 7/2020 | Lipson | G02F 1/292 |
| 2021/0018599 | A1 * | 1/2021 | Lu | G01S 17/42 |
| 2021/0271148 | A1 * | 9/2021 | Yi | G01S 7/4814 |
| 2022/0043323 | A1 * | 2/2022 | Skirlo | G01S 7/4813 |
| 2022/0137481 | A1 * | 5/2022 | Choi | G02F 1/3138 385/2 |
| 2022/0302585 | A1 * | 9/2022 | Wang | G01S 7/4814 |
| 2023/0117688 | A1 * | 4/2023 | Watts | G01S 17/42 385/14 |
| 2023/0152453 | A1 * | 5/2023 | Lee | G02B 6/122 356/5.09 |
| 2023/0341558 | A1 * | 10/2023 | Kato | G01S 17/89 |
| 2023/0350216 | A1 * | 11/2023 | Lee | G01S 7/4814 |
| 2024/0069405 | A1 * | 2/2024 | Kim | G01S 7/4814 |
| 2024/0077594 | A1 * | 3/2024 | Yu | G01S 17/42 |
| 2024/0077671 | A1 * | 3/2024 | Zhuang | G01S 17/931 |
| 2024/0085757 | A1 * | 3/2024 | Deng | G02B 6/122 |
| 2024/0168131 | A1 * | 5/2024 | Kim | G01S 17/931 |
| 2024/0192330 | A1 * | 6/2024 | Kim | G01S 7/4815 |
| 2024/0219806 | A1 * | 7/2024 | Fowler | G01S 7/4814 |
| 2024/0231177 | A1 * | 7/2024 | Mak | G01S 7/4814 |
| 2024/0272513 | A1 * | 8/2024 | Liu | G02F 1/292 |
| 2024/0295639 | A1 * | 9/2024 | Phare | G01S 7/4815 |
| 2024/0385461 | A1 * | 11/2024 | Lee | H01S 3/094069 |
| 2025/0035751 | A1 * | 1/2025 | Yu | G01S 7/4817 |
| 2025/0044505 | A1 * | 2/2025 | Zheng | G02B 27/0905 |
| 2025/0067927 | A1 * | 2/2025 | Wu | G02B 6/30 |
| 2025/0067928 | A1 * | 2/2025 | Wu | C23C 16/402 |
| 2025/0076468 | A1 * | 3/2025 | He | G01S 7/4817 |
| 2025/0076629 | A1 * | 3/2025 | Zakaria | G03H 1/265 |
| 2025/0164612 | A1 * | 5/2025 | Aoki | G01S 7/4818 |
| 2025/0164643 | A1 * | 5/2025 | Utsumi | G01S 7/4814 |

OTHER PUBLICATIONS

Written Opinion corresponding to application PCT/US2023/073378, dated Jan. 4, 2024, 5 pages.

Hutchison et al., High-resolution aliasing-free optical beam steering, Optica, vol. 3, No. 8, Aug. 5, 2016, pp. 887-890.

Kwong et al., 1×12 Unequally spaced waveguide array for actively tuned optical phased array on a silicon nanomembrane, Applied Physics Letter 99, Aug. 2, 2011, 3 pages.

Komljenovic et al., Sparse aperiodic arrays for optical beam forming and LIDAR, Optics Express, vol. 25, No. 3, Feb. 6, 2017, pp. 2511-2528.

* cited by examiner 100
101
102
104
106
108
110
111
112
113
114a
114b
114c
114d
115
117
D1
D2
D3
Width: 800nm
5μm
80μm
15μm
1.45
2
500nm 100
102
104
106
108
110
111
112
114a
114b
114c
114d
D1
D2
D3
Length/width 30:1
110a
110d
110p
1.45
1.45
800nm
Pitch
300nm 100
104
102
109
106
D1
D2
D3
111
109
110
110p
108
110n
110o
110m
110l
110k
L16
(right)
110j
L16
(left)
110i
110h
116
110g
110f
110e
P16-P1
110d
110c
L1 (left)
L2 (right)
A
MID
110b
110a 100
116
116p
116o
116n
116m
116l
116k
116j
116i
116h
116g
116f
116e
116d
116c
116b
116a
D1
$S_{o,p}$
$S_{n,o}$
$S_{m,n}$
$S_{l,m}$
$S_{k,l}$
$S_{j,k}$
$S_{i,j}$
$S_{h,i}$
$S_{g,h}$
$S_{f,g}$
$S_{e,f}$
$S_{d,e}$
$S_{c,d}$
$S_{b,c}$
$S_{a,b}$
$A_{END}$ 100
101
104
110
126
106
124
116
102
$H_{126}$
$H_{124}$
$H_{122}$
122
118
D3
D2
D1

200
202
208
$212_M$
$206_M$
$210_M$
$212_2$
$206_2$
$210_2$
$212_1$
$206_1$
$210_1$
204
D3
D2
D1

400
Begin
Form Base Layer of Waveguide Array onto Base Substrate
410
Determine Waveguide Pattern
420
Fabricate Pattern Layer according to the Determined Waveguide Pattern
430
Form Top Layer on Pattern Layer
440
End

OPTICAL PHASED ARRAY DEVICE AND METHOD OF MANUFACTURE

TECHNICAL FIELD

This disclosure relates to optical phased arrays and devices incorporating optical phased array(s), such as those used for light detection and ranging (LIDAR, LiDAR, or lidar), and methods for manufacturing optical phased arrays, namely end-firing optical phased arrays.

BACKGROUND

Optical phased arrays are used in various devices to guide light (including, for example, infrared and/or near-infrared electromagnetic radiation), such as for use in lidar applications, and may be coupled to a light source and a light sensor so that waveguides or waveguide paths within the optical phased array guide light appropriately between a collector side (at which the light source and the light sensor are located) and an emitter side (at which emitters (emitting or firing portions) are located). At the emitter side, light passes between the optical phased array and the atmosphere (or another medium).

Beam engineering is important in many light detection and ranging (LiDAR) applications. Edge-emitter or end-firing optical phased arrays are relatively new and typically employ relative symmetric construction, such as where a constant pitch between paths and/or edge emitters is used. There is a need to improve beam steering properties of an end-firing or edge-emitting optical phased array while minimizing crosstalk and/or other such interference.

SUMMARY

In accordance with an aspect of the disclosure, there is provided an optical phased array that generates a phased array output, wherein the optical phased array includes a common path branching into a plurality of waveguide paths that each terminates at a separate one of a plurality of edge emitters. The plurality of edge emitters are spaced apart from one another along a first axis, and the first axis extends in a first dimension along a common edge of the optical phased array. The spacing of the plurality of emitters along the first axis is aperiodic.

According to various embodiments, this optical phased array device discussed in the previous paragraph may further include any one of the following features or any technically-feasible combination of some or all of these features:

- the optical phased array device is a solid-state lidar device;
- the phased array output is comprised of infrared or near-infrared electromagnetic radiation;
- two or more of the plurality of waveguide paths are configured according to an omega shaped phase delay configuration;
- each of the plurality of waveguide paths is configured according to the omega-shaped phase delay configuration;
- the plurality of waveguide paths are disposed within a pattern layer having a pattern comprised of $Si_3N_4$;
- the spacing for each of the plurality of emitters is symmetric about an axis extending in a second dimension orthogonal to the first dimension;
- the plurality of waveguide paths are disposed in an optical phased array plane defined within the first dimension and the second dimension;
- spacing of two or more of the plurality of edge emitters is determined based on an aperiodic constant that varies according to a recursive function that incorporates the aperiodic constant for an adjacent edge emitter; and/or
- the aperiodic constant for the two or more edge emitters is determined based on both a first predetermined length of a first waveguide path of the plurality of waveguide paths and a second predetermined length of the first waveguide path of the plurality of waveguide paths, and wherein the first predetermined length of the first waveguide path and the second predetermined length of the first waveguide path each extends in the first dimension.

In accordance with another aspect of the disclosure, there is provided a method of manufacturing an optical phased array for an optical phased array device. The method includes: forming a base layer of a waveguide array on a base substrate; determining a waveguide pattern defining a plurality of waveguide paths; and fabricating a pattern layer of the waveguide array on top of the base layer of the waveguide array according to the determined waveguide pattern. The plurality of waveguide paths branch from a common path and terminate at a plurality of edge emitters, and the plurality of edge emitters are spaced apart from one another along a first axis. The first axis extends in a first dimension along an edge of the optical phased array, and spacing of two or more of the plurality of emitters along the first axis is aperiodic. The plurality of waveguide paths include an omega shaped phase delay configuration.

According to various embodiments, this method discussed in the previous paragraph may further include any one of the following features or any technically-feasible combination of some or all of these features:

- the plurality of edge emitters are spaced along the first axis according to $ACn=ACn-1+n-1$, where ACn is an aperiodic constant for the nth edge emitter, and where an initial predetermined value is used for ACn−1 when n=1;
- a second axis extending in the first dimension and parallel to the first axis in a first dimension extends through a phase delay modulator portion of the plurality of waveguide paths, and wherein the waveguide paths are spaced aperiodically along the second axis; and/or
- at least one of the plurality of waveguide paths includes a phase delay configuration in which the at least one waveguide path extends, when taken in a direction from a collector side extending to an emitter side, in the first dimension and then in a second dimension that is orthogonal to the first dimension.

In accordance with another aspect of the disclosure, there is provided a method of manufacturing an optical phased array for an optical phased array device. The method includes: forming a base layer of a waveguide array on a base substrate; determining a waveguide pattern defining a plurality of waveguide paths; and fabricating a pattern layer of the waveguide array on top of the base layer of the waveguide array according to the determined waveguide pattern. The plurality of waveguide paths branch from a common path and terminate at a plurality of edge emitters, and the plurality of edge emitters are spaced apart from one another along a first axis. The first axis extends in a first dimension along an edge of the optical phased array, and spacing of the plurality of edge emitters is determined based on an aperiodic constant that varies amongst the plurality of edge emitters. The aperiodic constant for at least one edge emitter of the plurality of edge emitters is determined using a recursive function that incorporates the aperiodic constant for an adjacent edge emitter.

According to various embodiments, this method discussed in the previous paragraph may further include any one of the following features or any technically-feasible combination of some or all of these features:

- the aperiodic constant for the two or more edge emitters is determined using the recursive function;
- the aperiodic constant for each of the two or more edge emitters is defined according to $AC_n = AC_{n-1} + n - 1$, where $AC_n$ is an aperiodic constant for the nth edge emitter, and where an initial predetermined value is used for $AC_{n-1}$ when $n=1$;
- the aperiodic constant for the at least one edge emitter is determined based on both a predetermined length of a first waveguide path of the plurality of waveguide paths and a predetermined length of a second waveguide path of the plurality of waveguide paths, wherein the predetermined length of the first waveguide path and the predetermined length of the second waveguide path each extends in the first dimension;
- the aperiodic constant for the at least one edge emitter is determined based on both a first predetermined length of a first waveguide path of the plurality of waveguide paths and a second predetermined length of the first waveguide path of the plurality of waveguide paths, and wherein the first predetermined length of the first waveguide path and the second predetermined length of the first waveguide path each extends in the first dimension; and/or
- the plurality of waveguide paths include an omega shaped phase delay configuration where two or more waveguide paths of the plurality of waveguide paths each includes a first leg extending in a first direction within the first dimension and a second leg extending in a second direction within the first dimension, wherein the first predetermined length of the first waveguide path is a length of the first leg, and wherein the second predetermined length of the first waveguide path is a length of the second leg.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

Figure 1:
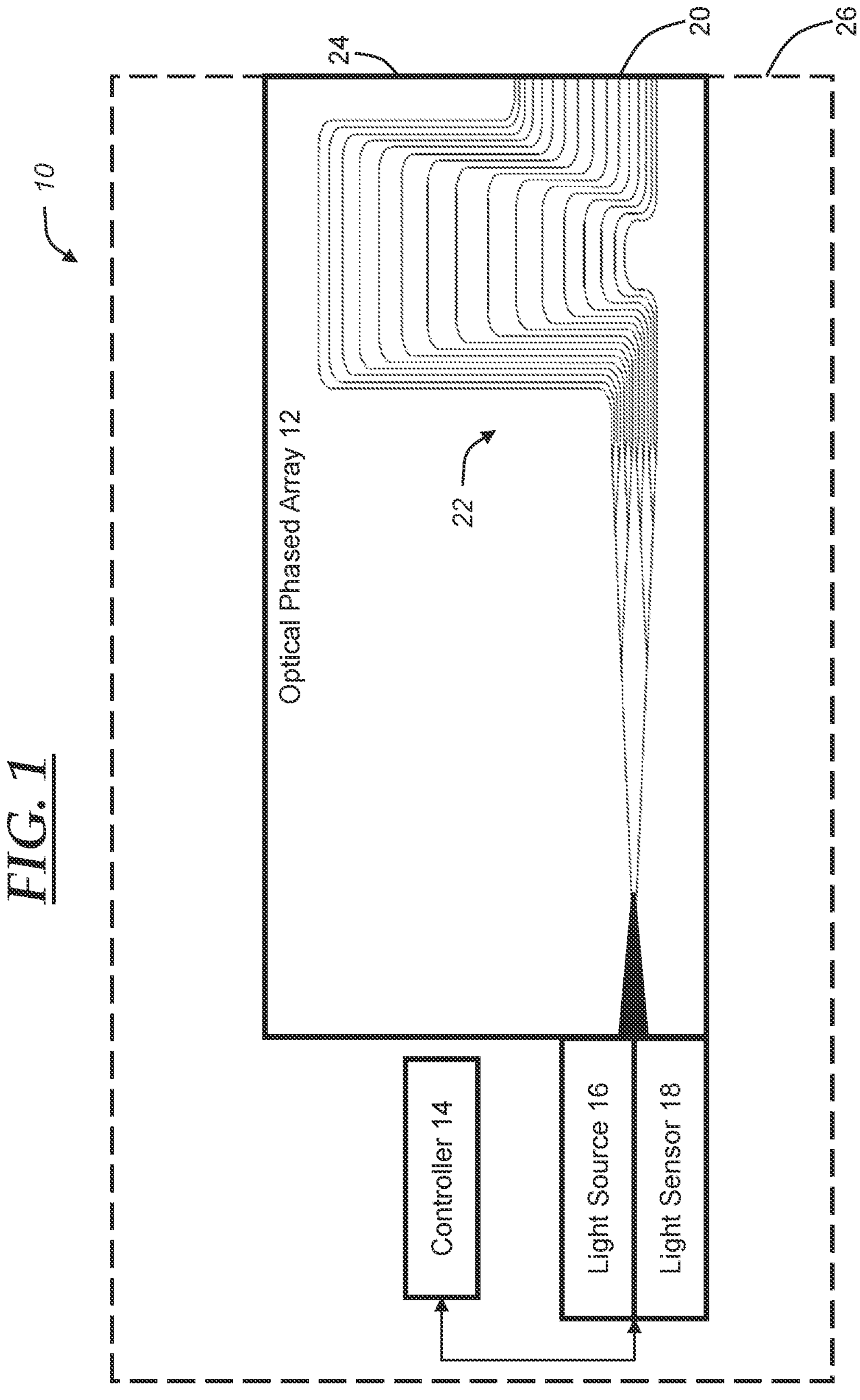
FIG. 1 is a depiction of an optical phased array device having an optical phased array, including a plan view of a pattern layer of the optical phased array where waveguide paths extend from a collector side to an emitter side, according to one embodiment.

The system and method described herein enables an optical phased array device having an optical phased array to be manufactured, namely where the optical phased array includes a plurality or set of waveguide paths that terminate at a common end or edge at which light is (or other electromagnetic waves are) emitted. The set of waveguide paths begins at a collected side where it is formed as a common path that then branches into a plurality of individual waveguides, each terminating at the common end or edge (collectively, referred to as "common edge"). The ends or terminal portions of each waveguide path are spaced apart along a first axis, which extends in a first dimension. The spacing may be set according to a waveguide pattern and may be aperiodic, which means that the spacing between adjacent elements is not constant or uniform throughout. Thus, according to at least some embodiments, each waveguide path of the set of waveguide paths ends at the common edge where electromagnetic radiation (referred to herein simply as "light") is emitted and leaves the optical phased array—these end or terminal portions of the waveguide paths from which light is emitted are referred to as "firing end portions" and "edge emitters." The set of waveguide paths receive light from a light source that is coupled to the optical phased array, and the set of waveguide paths are configured according to an aperiodic pattern such that spacing of ends of the set of waveguide paths is non-uniform along a first axis—this is referred to as an aperiodic edge-firing configuration. The first axis extends in the first dimension and along the common edge at which the firing end portions, corresponding to ends of waveguide paths ending at the common edge, are located and, in embodiments, the first dimension may correspond to a vertical dimension such that the ends of the waveguide paths are vertically-spaced; in other embodiments, the first dimension may correspond to a horizontal dimension such that the ends of the waveguide paths are horizontally-spaced.

According to at least some embodiments, there is provided a method of manufacturing an optical phased array for an optical phased array device with an aperiodic edge-firing configuration. According to embodiments, the method includes: forming a base layer of a waveguide array on a base substrate; determining a waveguide pattern defining a plurality of waveguide paths, wherein the plurality of waveguide paths terminate at a plurality of edge emitters, wherein the plurality of edge emitters are spaced apart from one another along a first axis in a first dimension, wherein the first axis extends along an edge of the optical phased array, wherein spacing of the plurality of emitters along the first axis is aperiodic thereby constituting an aperiodic edge firing configuration, and wherein the plurality of waveguide paths include an omega shaped phase delay configuration;

and fabricating a pattern layer of the waveguide array on top of the base layer of the waveguide array according to the determined waveguide pattern. Of course, variations of this method are possible, as discussed below.

According to at least some embodiments, the optical phased array device includes the optical phased array, the light source, a light sensor, and a controller. The light source is coupled to the optical phased array so that light may be transmitted through the set of waveguide paths of the optical phased array, and the light sensor is coupled to the optical phased array so that the light sensor may receive light impinged on the optical phased array. The controller is operatively coupled to the light source so as to control generation and emission of light by the light source and is operatively coupled to the light sensor so as to determine information based on the light received at the light sensor. In embodiments, the controller includes at least one processor and memory accessible by the at least one processor, and the memory stores computer instructions that, when executed by the at least one processor, cause the optical phased array device to operate, including transmitting light from the optical phased array and/or processing information concerning light received at the optical phased array. Of course, variations of this optical phased array device are possible, as discussed below.

The optical phased array of the optical phased array device may have an edge-firing or end-firing (collectively referred to as "edge-firing") configuration that is aperiodic (or an "aperiodic edge-firing configuration") in which spacing of the plurality of emitters is non-uniform and set according to an aperiodic pattern. In some embodiments, the aperiodic pattern may define spacings that follow one or more linear patterns, such as where the spacing between adjacent elements increases linearly or decreases linearly. And, in embodiments, the aperiodic pattern may have spacing set according to a predefined equation or algorithm, for example; it will be appreciated that many different types of techniques may be employed to achieve the aperiodic or non-uniform spacing. And, in some embodiments, the aperiodic pattern may be symmetrical about a line of symmetry that runs orthogonal to the first dimension (in a second dimension) and through the middle of the array or set of edge emitters. In some embodiments, simulations and/or testing may be carried out to determine optimal or preferred spacing, such as through using machine learning-based simulations to determine the spacing of the aperiodic pattern. A variety of different aperiodic patterns may be used and the particular pattern may be selected according to one or more conditions or constraints. For example, simulations may be carried out to determine an aperiodic pattern having a minimal or lowest amount of side lobing and this aperiodic pattern may then be employed in the optical phased array.

With reference to FIG. 1, there is shown an embodiment of an optical phased array device 10 having an optical phased array 12, a controller 14, a light source 16, and a light sensor 18. The optical phased array device 10 may be used for a variety of different applications according to various embodiments, such as, for example, a solid-state lidar device. In at least some embodiments, the optical phased array device 10 may be used for two-dimensional and/or three-dimensional lidar applications, and/or may enable solid state scanning through varying the time delay of emitted light generated from a coherent light produced by the light source 16, for example. It will be appreciated that the depiction of the optical phased array device 10 in FIG. 1 is diagrammatic and that the optical phased array device may be incorporated into another device or apparatus.

Figure 7:
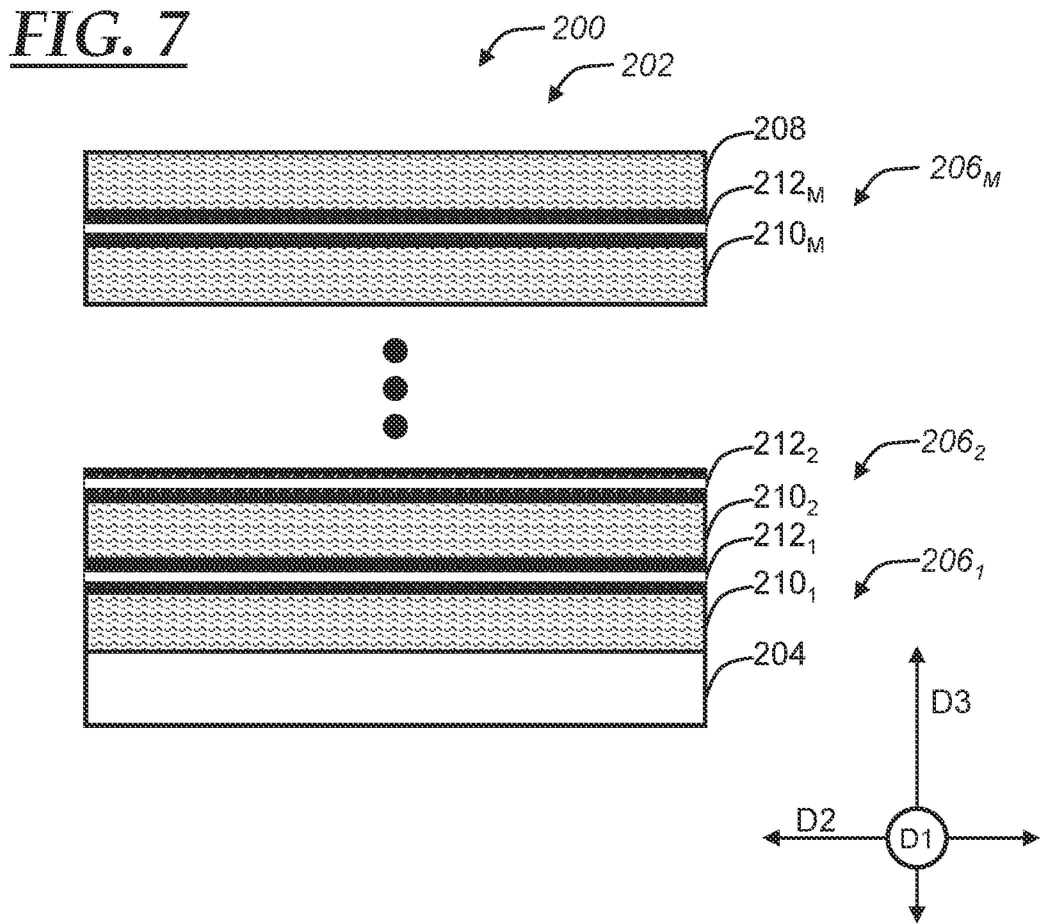
FIG. 7 is a side view of an optical phased array having a plurality of pattern layers, according to one embodiment.
Figure 8:
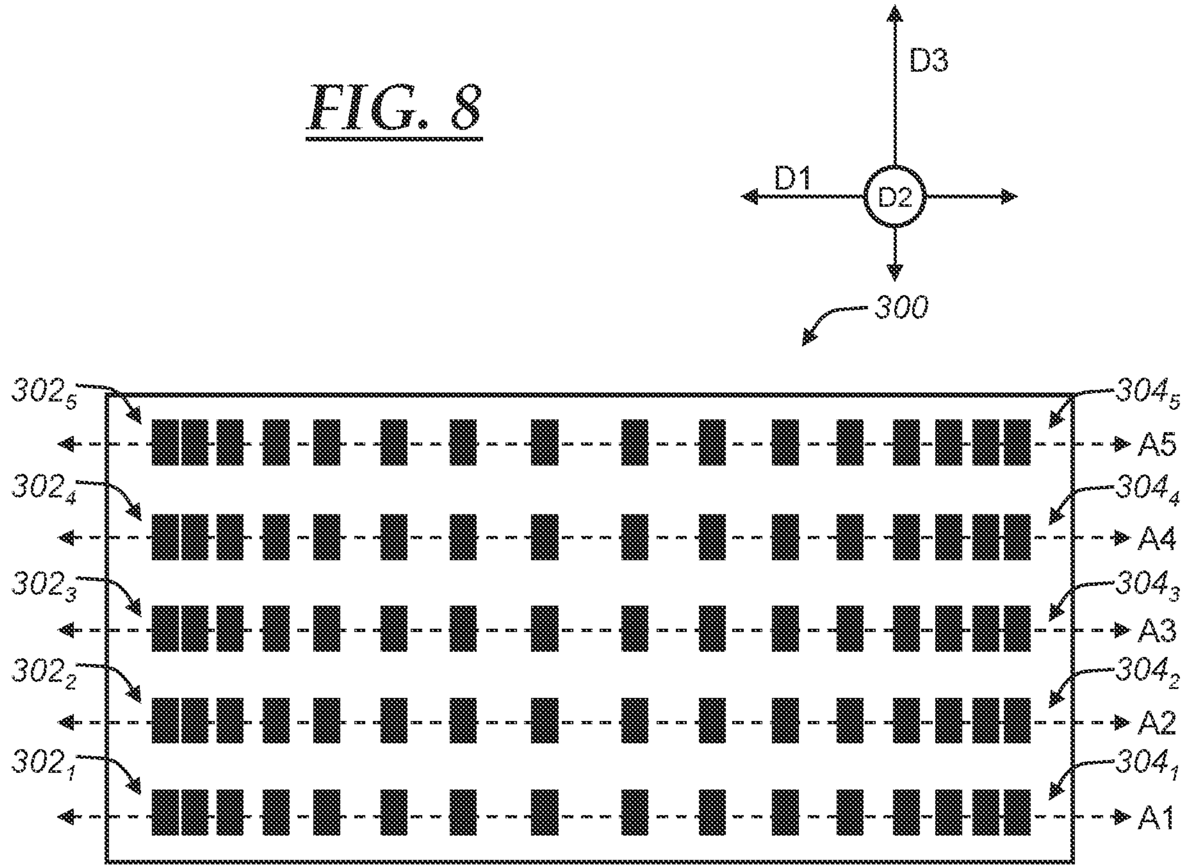
FIG. 8 is an end view of an optical phased array having a plurality, specifically, five, pattern layers, according to one embodiment.

The optical phased array 12 is shown as being operatively coupled to the light source 16 and the light sensor 18, and may be used to transmit light generated or provided by the light source 16 and to receive light impinged at the optical phased array 12 at the light sensor 18. The optical phased array 12 is an edge-firing optical phased array in that it includes a plurality of edge emitters 20 that are disposed at an edge of a planar plate-shaped structure, such as a Silicon-based wafer having one or more waveguide arrays or layers thereon. The optical phased array 12 may employ a Silicon-based waveguide structure forming a waveguide array and having a $Si_3N_4$ pattern layer and a $SiO_2$ base layer, such as that which is disclosed in U.S. Patent Application Publication No. 2021/0271148 A1, the entire contents of which are hereby incorporated by reference. In some embodiments, multiple waveguide arrays (each comprising a pattern layer and a base layer) may be sandwiched together (mated or stacked planarly together) so that a pattern layer of one waveguide array abuts a base layer of an adjacent waveguide array. This may be used to form a three-dimensional (3D) optical phased array, such as that which is shown in FIGS. 7-8 and discussed more below.

Figure 2:
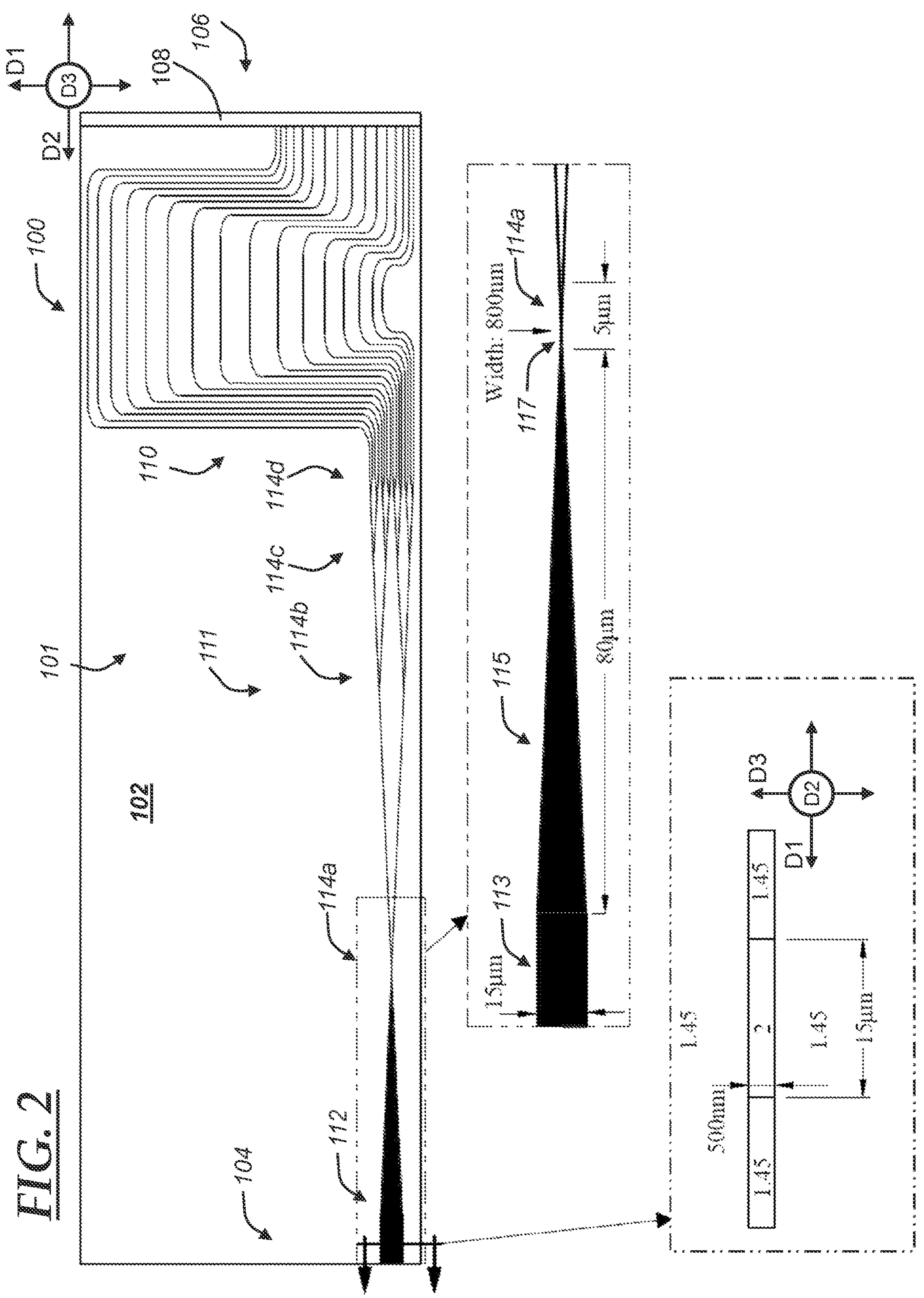
FIG. 2 is a plan view of an optical phased array that may be used for an optical phased array device, including a depiction of a first binary branching portion shown in plan view and a depiction of a cross-sectional view of a common path, according to one embodiment.

With reference still to FIG. 1, the plurality of edge emitters 20 may be comprised of terminal portions of waveguide paths 22 disposed within a waveguide array of the optical phased array 12. The edge emitters 20 (only a couple labeled in FIG. 1) are disposed at a common edge 24 and are spaced apart from one another along a first axis $A_{END}$ (FIG. 5) that extends in a first dimension, which is discussed more below in connection with the optical phased array 100 of FIGS. 2-6. The waveguide paths 22 are shown schematically in FIG. 1 as extending from the light source 16 and light sensor 18 to the edge emitters 20; it will be appreciated that the depiction of the waveguide paths in FIG. 1 is only for purposes of showing which elements are operatively coupled to one another and not for showing actual physical locations, configurations, or shapes of the waveguide paths, which may take a different form, such as that which is shown in FIG. 2 below. Those skilled in the art will appreciate that various coupling mechanisms for coupling the optical phased array 12 to the light source 16 and the light sensor 18 may be used. The waveguide paths 22 each provide a path through which light is able to travel so that light provided by the light source 16 may be emitted by the edge emitters 20 of the optical phased array 12. And, at least in some embodiments, the waveguide paths 22 each provide a path through which light is able to travel so that light impinged on the edge emitters 20 of the optical phased array 12 is received at the light sensor 18.

In embodiments, the components 12-18 of the optical phased array device 10 may be disposed on a common substrate 26, which may be a printed circuit board, according to one embodiment. In other embodiments, the components 12-18 may be arranged or disposed on different substrates and/or housed in different housings, for example.

With reference to FIGS. 2-6, there is shown an exemplary optical phased array 100 that may be used as the optical phased array 12 of the optical phased array device 10. It will be appreciated that FIGS. 2-8 indicate orientation relative to three dimensions, a first dimension D1, a second dimension D2, and a third dimension D3, which are all orthogonal to one another and that may correspond to X, Y, and Z axes, respectively. With specific reference now to FIG. 2, the optical phased array 100 includes a Silicon-based structure 101. The Silicon-based structure 101 may be a Silicon-on-insulator (SOI) platform having a Silicon-based two-dimensional (2D) waveguide array 102, and the waveguide array 102 has a collector side 104 and an emitter side 106 disposed on an opposite side of the waveguide array 102 from the collector side 104. The Silicon-based structure 101 may include a Silicon wafer and a single two-dimensional (2D) waveguide array; however, in other embodiments, the Silicon-based structure 101 may include a plurality of 2D waveguide arrays, such as for when a 3D optical phased array is used.

The collector side 104 is configured to be coupled to a light source and light sensor, such as the light source 16 and the light sensor 18 when used as the optical phased array 12 in the optical phased array device 10. The waveguide array 102 includes an edge 108 that extends in the first dimension D1, which is orthogonal to a second dimension D2. The optical phased array 100 includes a plurality or a set of waveguide paths (or simply "waveguides") 110 that extend generally in the second dimension D2 from the collector side 104 to the emitter side 106. In particular, the set of waveguide paths 110 starts at the collector side 104 and all are formed of a single or common path 112, which then splits or branches in a binary fashion multiple times so that sixteen waveguide paths 110 are generated. The waveguide paths 110 may each be formed as a 1×N multimode interferometer (MMI) where N is the number of waveguide paths, which is sixteen in the depicted embodiment; specifically, in the embodiment depicted in FIGS. 2-4, each waveguide path 110 begins as a part of the common path 112 and then are split four times, at a first binary split or branching portion 114*a*, a second binary split or branching portion 114*b*, a third binary split or branching portion 114*c*, and a fourth binary split or branching portion 114*d*, so as to yield sixteen unique waveguide paths 110*a-p*, as shown in FIG. 4. In other embodiments, a different number N of waveguide paths may be used.

With reference to FIG. 2, namely the expanded portion of the first binary branching portion 114*a* shown in plan view and the cross-sectional view of the common path 112, there are shown exemplary dimensions that may be used for the waveguide array 102. In particular, the common path 112 extends in the second dimension D2 from a first fixed width portion 113 to a tapered width portion 115 and then to a second fixed width portion 117. The height, taken in the third dimension, of the common path 112 is 500 nm, as shown in FIG. 2. The first fixed width portion 113 has a common path start width (taken along dimension D2) of 15 μm; of course, in other embodiments, the common path start width may be larger or smaller, such as, for example, 15 μm+/−8 μm and, preferably in some embodiments, 15 μm+/−3 μm. The tapered width portion 115 of the common path 112 extends, in the second dimension D2, from an end of the first fixed width portion 113 to the second fixed width portion 117, which is referred to as the common path tapered length and is 80 μm in the depicted embodiment; of course, in other embodiments, the common path tapered length may be larger or smaller, such as, for example, 80 μm+/−40 μm and, preferably in some embodiments, 80 μm+/−10 μm. The second fixed width portion 117 has a common path end width (taken along dimension D2) of 800 nm; of course, in other embodiments, the common path end width may be larger or smaller, such as, for example, 800 nm+/−300 nm and, preferably in some embodiments, 800 nm+/−100 nm. The second fixed width portion 117 has a fixed portion length of 5 μm, which extends from an end of the tapered width portion 115 to the first binary split 114*a*; of course, in other embodiments, the fixed portion length of the second fixed width portion 117 may be larger or smaller, such as, for example, 5 μm+/−3 μm and, preferably in some embodiments, 5 μm+/−1 μm.

Figure 3:
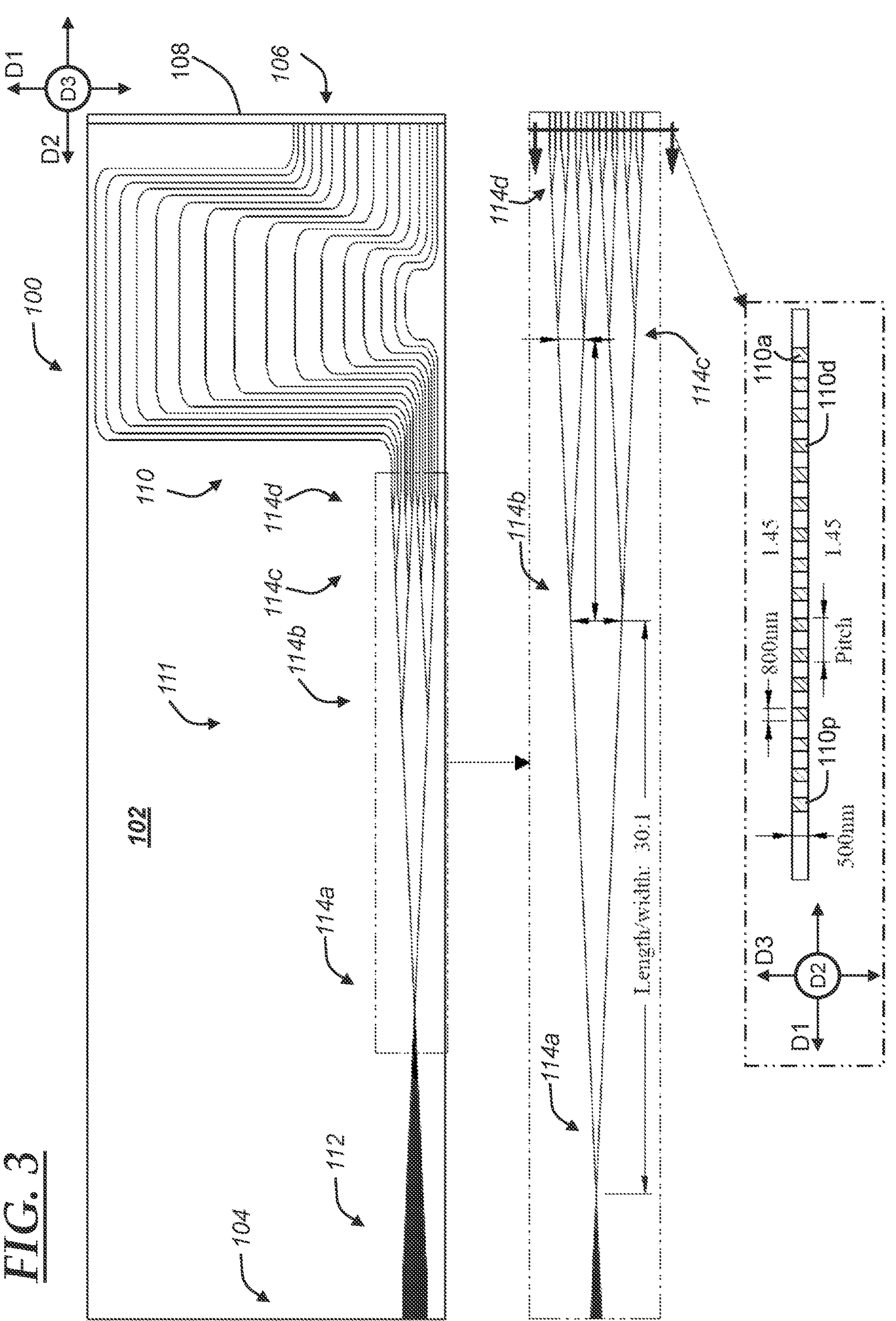
FIG. 3 is a plan view of the optical phased array of FIG. 2, including a depiction of an expanded portion of a tree splitter or MMI of the optical phased array and a cross-section of a pattern layer of the optical phased array, according to one embodiment.
Figures 4, 5:
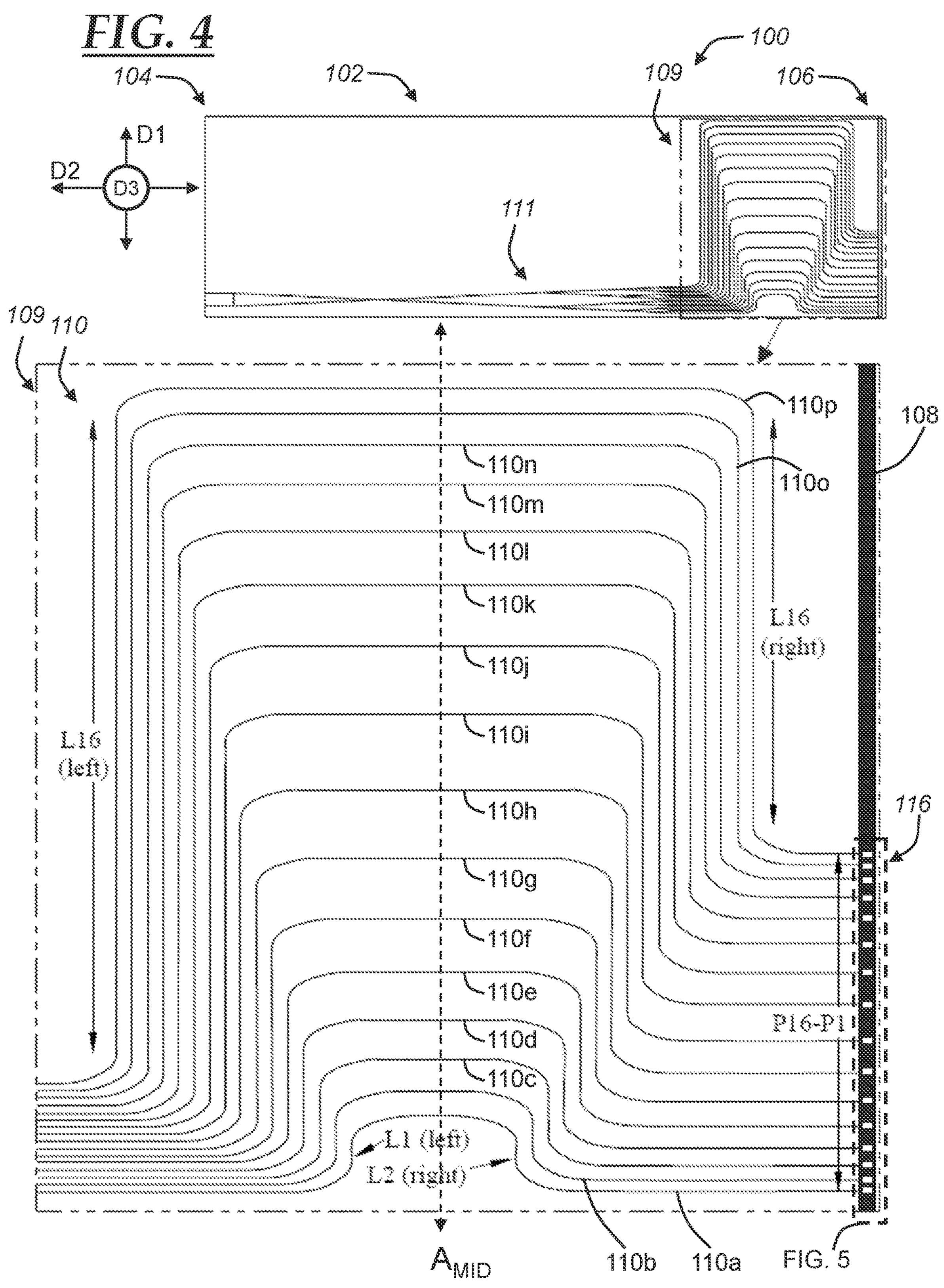
FIG. 4 is a plan view of the optical phased array of FIG. 2, being focused on a phase delay modulator of the optical phased array, according to one embodiment.
FIG. 5 depicts a portion of the optical phased array of FIG. 2 and, specifically, edge emitters that are aperiodically spaced, according to one embodiment.
Figure 5:
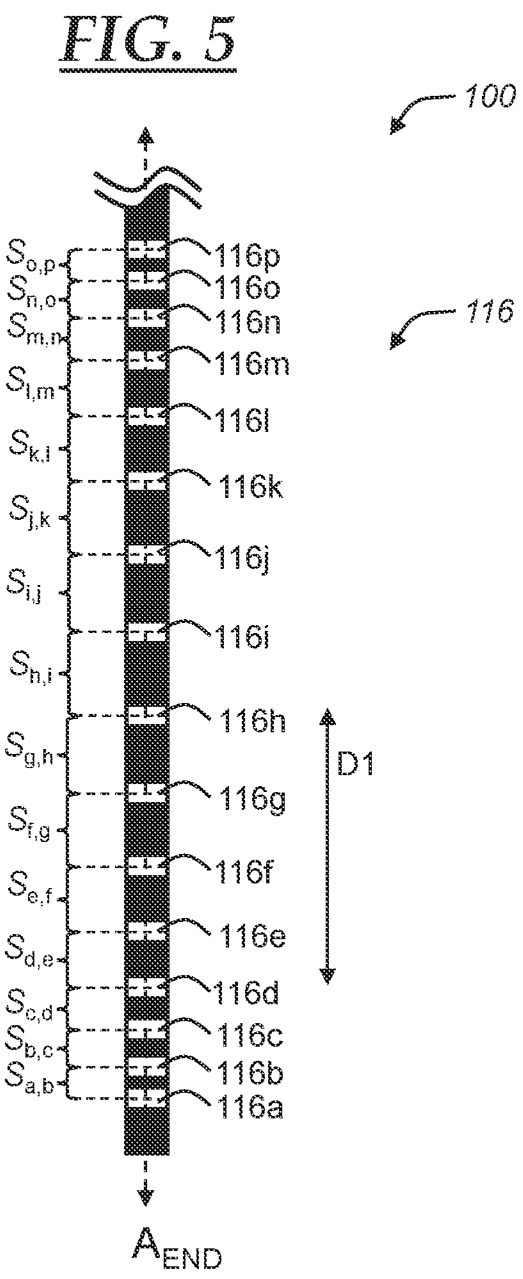

With reference now specifically to FIG. 3, there is shown a plan view of the optical phased array 100 with an expanded portion of the tree splitter or MMI 111, which includes the four binary branching portions 114*a-d*. In particular, a first length-width ratio of a first tree branch section (extending in the second dimension D2 between the first and second binary branching portions 114*a-b*) is 30:1 (length:width) where the length is measured along the second dimension D2 and the width is measured along the first dimension D1 at a portion where the second binary branch section (or second binary branching portion 114*b*) begins. In at least one embodiment, a second tree branch section (extending from an emitter-side end of the first tree branch section in the second dimension D2 toward the emitter side 106) and a third tree branch section (extending from an emitter-side end of the second tree branch section in the second dimension D2 toward the emitter side 106) may have a second and third length-width ratio, respectively, that is equal to the first length-width ratio, which is 30:1 in the present depicted embodiment. Of course, in other embodiments, the tree splitter 111 may be configured using ratios having different values, such as 20:1 or 40:1, for example.

As shown in the cross-sectional portion of FIG. 3, which is taken at an emitter-side end of the tree splitter 111 where the waveguide paths have been finally split into N separate paths/branches, the height of the waveguide paths 110, taken in the third dimension D3, is 500 nm and the width (taken in the first dimension) of each waveguide path 110*a-p* is 800 nm. At this portion, each of the waveguide paths 110*a-p* are separated by a uniform pitch, which may be 2 μm for example; of course, in other embodiments, the pitch may be larger or smaller, such as, for example, 2 μm+/−1.5 μm and/or 2 μm+/−500 nm.

With reference now specifically to FIG. 4, an expanded portion of a phase delay modulator or phase shifter portion 109 is shown in which the waveguide paths 110 each extend in a first direction of the second dimension D2 (from the left to right side of FIG. 4) from the tree splitter 111, then extend in a first direction of the first dimension D1 for a length (referred to as a "first leg length") (such as is indicated at L1 (left) for waveguide path 110*a* and L16 (left) for waveguide path 110*p*), then extend in the first direction of the second dimension D2, then in a second direction of the first dimension D1 that is opposite the first direction of the first dimension D1 for a length (referred to as a "second leg length") (such as is indicated at L1 (right) for waveguide path 110*a* and L16 (right) for waveguide path 110*p*), and finally in the first direction of the second dimension D2 at which the waveguide paths 110*a-p* each end at a respective one of the emitters 116*a-p*; this configuration is referred to as an omega (Ω) shaped phase delay configuration. According to one embodiment, the first leg length L1 (left) of the first waveguide path 110*a* is 5 μm and the second leg length L1 (right) of the first waveguide path 110*a* is 5 μm. The right-angle or 90 degree turns between the first and second dimensions, as shown in the expanded portion of FIG. 4, may each be rounded in a circular manner with a predetermined radius of curvature, such as, for example, 8 μm; in other embodiments, a smaller or larger radius of curvature may be used, such as, for example, 8 μm+/−4 μm and, preferably in some embodiments, 8 μm+/−1 μm.

As shown in FIG. 4, an axis $A_{MID}$ in the first dimension extends through a middle portion of the phase delay modulator or phase shifter portion 109. In at least one embodiment, spacing along this axis $A_{MID}$ is aperiodic such that spacing, in the first dimension, between adjacent waveguide paths is not uniform; this is different from the uniform spacing that is present at the beginning of the phase delay modulator or phase shifter portion 109, which is shown best in cross-section in FIG. 3. In other embodiments, uniform spacing may be used along the axis $A_{MID}$.

Within the phase delay modulator portion 109, each waveguide path 110*a-p* has an omega-shaped delay configuration, such as that which is shown in FIG. 4 and described above. In some embodiments, one or more of the waveguide paths 110*a-p* does not have an omega-shaped delay configuration, such as the first waveguide path 110*a*, which may simply be a straight path extending in the second dimension D2 from the tree splitter 111 to the emitter 116*a*; in such embodiments, each of the other waveguide paths 110*a-p* may have an omega-shaped delay configuration. Each of the waveguide paths 110*a-p* ends or terminates at the edge 108 at a firing portion at which light is emitted and this portion may be referred to as an edge emitter 116*a-p*.

With reference to FIG. 5, there is shown a portion of the optical phased array 100 and, specifically, edge emitters 116*a-p*, which are collectively referred to as a plurality or set of edge emitters 116. The waveguide paths 110*a-p* may be designed and routed so that a particular or desired dimensionality of the spacing is achieved such that, for example, spacing between adjacent edge emitters along the edge 108 is non-uniform. As shown in FIG. 5, there are fifteen spaces $S_{X,Y}$ that span between adjacent edge emitters 116*a-p*, where X and Y indicate the edge emitters that define the given space S; for example, space $S_{a,b}$ spans between edge emitter 116*a* and edge emitter 116*b*, and space $S_{c,d}$ spans between edge emitter 116*c* and edge emitter 116*d*. The spacing may be determined based on reference to specifications used to manufacture the optical phased array and/or based on measurements taken with, for example, aid of a microscope or optical measurement device. As used herein, "non-uniform" means that spacing amongst adjacent edge emitters is not equal. For example, the first space $S_{a,b}$ between the edge emitter 116*a* and the edge emitter 116*b* may be 3 μm and the second space $S_{b,c}$ between the edge emitter 116*b* and the edge emitter 116*c* may be 5 μm; therefore, the set of edge emitters (here, elements 116*a-c*) is non-uniform. The set of edge emitters 116 is non-uniform as shown in FIG. 4 since spacing is not equal amongst the pairs of adjacent edge emitters 116*a-p*.

According to one embodiment, the plurality of waveguide paths 110 is configured so that the following condition is satisfied:

$$Ln(\text{left})-Ln(\text{right})=\text{pitch}*(n-1) \quad \text{(Eq. 1)}$$

$$((Ln(\text{left})+Ln(\text{right}))-(L1(\text{left})+L1(\text{right})))/(Pn-P1)=C \quad \text{(Eq. 2)}$$

where Ln (left) is the first leg length of the nth waveguide path, Ln (right) is the second leg length of the nth waveguide path, Pn is the pitch of the nth emitter, where n is between 1 and N inclusively, where N is the number of waveguide paths 110 and emitters 116 (N=16 in the illustrated embodiment), and where C is a constant, which may be predefined. According to at least some embodiments, the plurality of waveguide paths 110 is configured so that the following condition is satisfied (in addition to or in lieu of the conditions noted above in Eq. 1 and Eq. 2):

$$Pn=(n-1)*\text{pitch}+\text{aperiodic pattern}$$

where the pitch is equal to the pitch shown above in FIG. 3, which may be 2 μm in some embodiments. The aperiodic pattern may be selected according to the following algorithm:

$$ACn=ACn-1+n-1 \text{ when } n<=N/2$$

$$ACn=ACn-1+N-(n-1) \text{when } n>N/2$$

where ACn is an aperiodic constant for the nth waveguide path. When determining the aperiodic constant for the first waveguide path (i.e., n=1), an initial predetermined value, such as zero (0), for example, may be used for AC0. The algorithm above is an example of a symmetric algorithm that results in symmetry of the spacing of the edge emitters 116, and this may be referred to as an aperiodic symmetric edge emitter configuration. The pitch equation defined by Pn above is a recursive function and may be referred to as an aperiodic pitch function.

Figure 6:
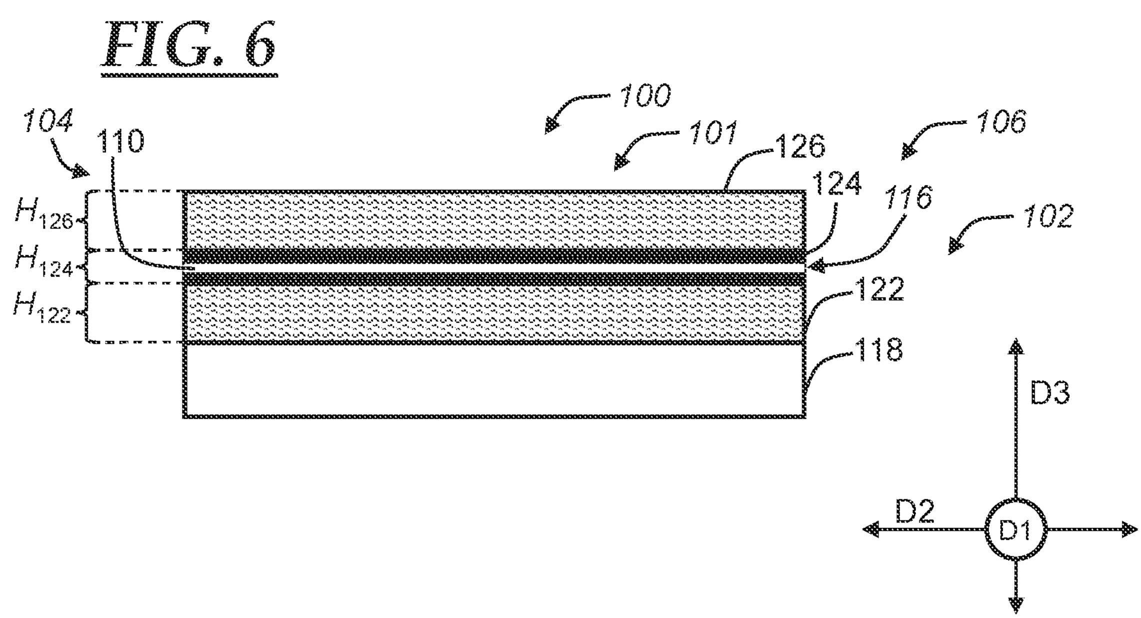
FIG. 6 is a side view of an optical phased array having a single pattern layer, according to one embodiment.

With reference to FIG. 6, there is shown the optical phased array 100, including the Silicon-based structure 101, which includes a base 118 and the waveguide array 102. At least in some embodiments, the Silicon-based structure 101 may further include a top layer (e.g., top layer 126 discussed below) and/or coatings, such as an $SiO_2$ anti-reflection coating applied over the edge 108 whereat the plurality of emitters 116 are located. The base 118 may be a Silicon-based substrate, such as a Silicon wafer. The waveguide array 102 is comprised of a base layer 122 and a pattern layer 124. The base layer 122 may be comprised of $SiO_2$ and the pattern layer 124 may be comprised of $SiO_2$ (as a base material) and is patterned to form the waveguides or waveguide paths with $Si_3N_4$, such as that which is disclosed in U.S. Patent Application Publication No. 2021/0271148 A1, which is hereby incorporated by reference. However, the patterning, or pattern spatial configuration within the plane of D1 and D2 (the optical phased array plane), is different at least in that, in the present disclosure, the plurality of edge emitters 116 may be spaced along the first dimension D1 in an aperiodic fashion. In one embodiment, the base layer 122 may have a height $H_{122}$ of 2 μm and the pattern layer 124 may have a height $H_{124}$ of 500 nm, for example; of course, in other embodiments, various other heights may be used for the base layer 122 and the pattern layer 124, such as, 650 nm for the height $H_{124}$. The optical phased array 100 also includes the top layer 126, which may be a cladding layer comprised of, for example, $SiO_2$. The top layer 126 may have a height $H_{126}$ of 2 μm, in one embodiment.

In one embodiment, materials may be selected based on their refractive index; for example, with reference back to the cross-sectional portion of FIG. 2, in at least one embodiment, a Silicon-based material having a refractive index of 1.45 may be used for the base layer 122, the top layer 126, and the base material portions of the pattern layer 124. The patterned portions of the pattern layer 124, which may be comprised of $Si_3N_4$, may have a refractive index of 2.0. However, in other embodiments, materials having different refractive indices may be used.

With reference to FIG. 7, there is shown another embodiment of an optical phased array and, in particular, a multi-waveguide array optical phased array 200 that includes a Silicon-based structure 202 having a base 204, a plurality of waveguide arrays $206_{1 \ldots M}$ (with m denoting the index being between 1 and M where M represents the number of waveguide arrays), and a top layer 208 that may be a cladding or protection layer, for example. The base 204 may be a Silicon-based substrate, such as a Silicon wafer. Each of the plurality of waveguide arrays $206_m$ has a base layer $210_m$ and a pattern layer $212_m$. The discussion of the waveguide array 102 of the optical phased array 100 applies and is hereby attributed to each of the waveguide arrays $206_m$ of the optical phased array 200. The discussion of the top layer 126 of the optical phased array 100 applies and is hereby attributed to the top layer 208 of the optical phased array 200.

With reference to FIG. 8, there is shown a plan side view of an edge or face of a three-dimensional optical phased array device 300 that includes a multi-waveguide array optical phased array optical phased array, such as the multi-waveguide array optical phased array optical phased array 200 with N=16 and M=5 in the depicted embodiment of FIG. 7. As shown in FIG. 8, each of the waveguide arrays $302_1$, $302_2$, $302_3$, $302_4$, $302_5$ has a plurality of edge emitters $304_1$, $304_2$, $304_3$, $304_4$, $304_5$ spaced in the first dimension D1 along a respective axis Am on a common face 306. In other embodiments, the number of waveguide arrays M may vary; for example, two waveguide arrays may be used or, in another example, ten waveguide arrays may be used. In another embodiment, the pattern layer of at least one waveguide array is different from the pattern layer of at least one other waveguide array and, in one embodiment, the spacing, along the first dimension, of the edge emitters of a first waveguide array is different than the spacing, along the first dimension, of the edge emitters of a second waveguide array such that the edge emitters are not aligned in the third dimension D3.

Figure 9:
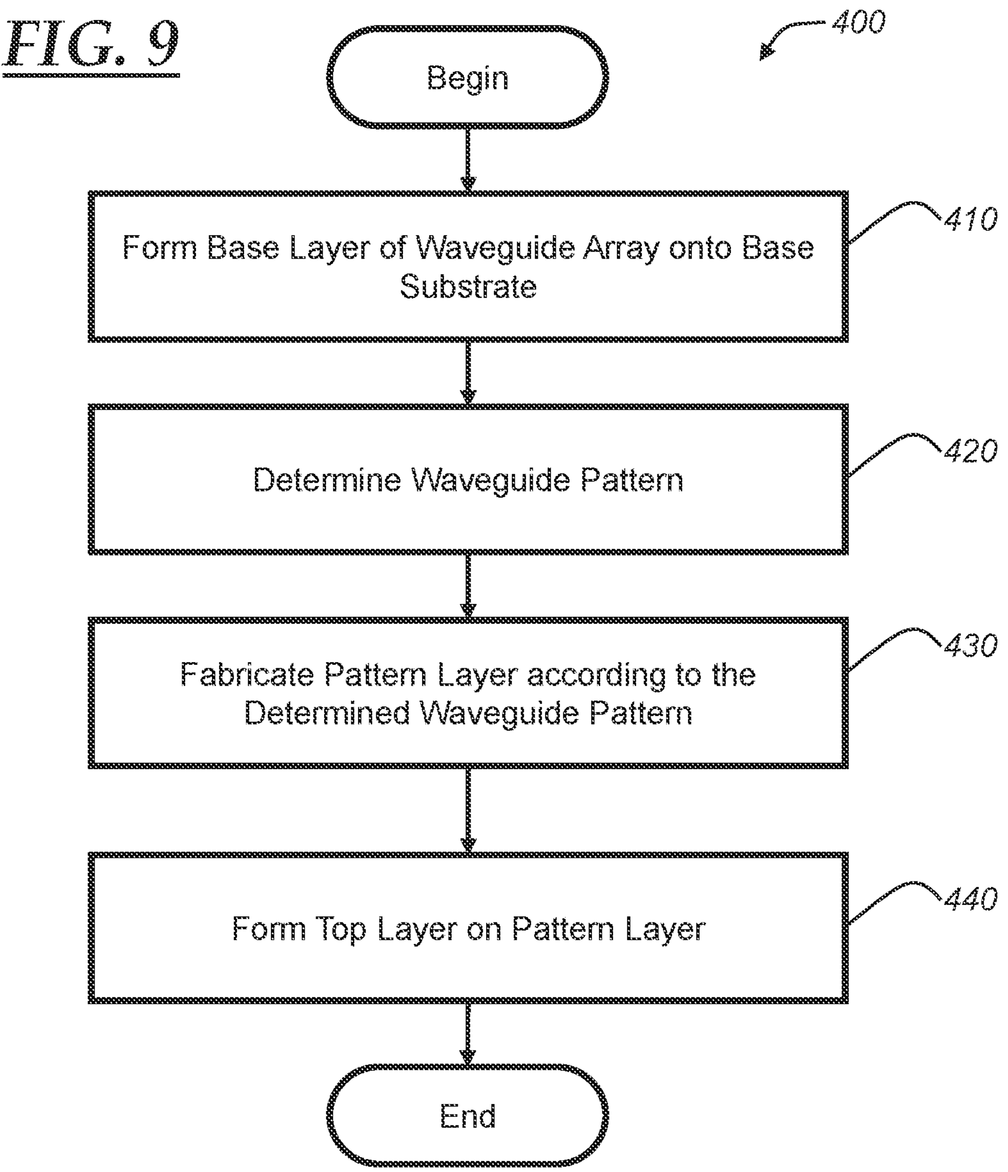
FIG. 9 is a flowchart depicting a method of manufacturing an optical phased array for an optical phased array device, according to one embodiment.

With reference to FIG. 9, there is shown a method 400 of manufacturing an optical phased array for an optical phased array device, wherein the optical phased array includes a plurality of waveguide paths each ending at an optical firing portion spaced apart from one another in a first dimension that extends along a common edge, and wherein spacing of the optical firing portion of the plurality of waveguide paths along the first dimension is aperiodic. According to at least some embodiments, the method 400 is carried out to manufacture the optical phased array 12 and/or optical phased array 100 discussed above. It will be appreciated that, while the steps 410-440 are discussed as being carried out in a particular order, those skilled in the art will appreciate that the steps may be carried out in any suitable and technically-feasible order.

The method 400 begins with step 410, wherein a base layer of a waveguide array is formed on a base substrate. As discussed above, the base layer 122 of the waveguide array 102 may be formed onto the base 118 of the Silicon-based structure 101. In at least one embodiment, the base layer 122 may be formed using the process discussed in C. Qin, K. Shang, S. Feng, G. Liu, S. Pathak and S. J. B. Yoo, "1×256 multi-layer, low-loss, Si3N4 waveguide optical phased arrays with 0.050° instantaneous-field-of-view," 2017 Conference on Lasers and Electro-Optics (CLEO), 2017, pp. 1-2. More details on fabrication may be found in U.S. Patent Application Publication No. 2021/0271148 A1, which is hereby incorporated by reference. In particular, paragraphs [0061]-[0072] of U.S. Patent Application Publication No. 2021/0271148 A1 discusses an optical phased array based beam steering structure having 6 $Si_3N_4$ pattern layers and 5 $SiO_2$ layers sandwiched alternatively between the 6 $Si_3N_4$ layers. Paragraphs [0061]-[0072] of U.S. Patent Application Publication No. 2021/0271148 A1 and the discussion regarding fabrication of the optical phased array and, in particular, the layers including the $Si_3N_4$ layers and $SiO_2$ layers of the optical phased array, is hereby incorporated by reference. The method 400 continues to step 420.

In step 420, a waveguide pattern defining a plurality of waveguide paths is determined. In at least some embodiments, the waveguide paths terminate edge emitters distributed or arranged in a first dimension along a common edge and the edge emitters are spaced non-uniformly or aperiodically from one another, such as discussed above. In at least some embodiments, the waveguide pattern is defined in a two-dimensional plane, such as the plane defined by the first dimension D1 and the second dimension D2 and which may be referred to as an optical phased array plane. The plurality of waveguide paths extend from a collector side to an emitter side and include a plurality of waveguide branches or splits in which two waveguide paths, having shared a common path up until the branch, branch into separate paths that are no longer coextensive when viewed in plan view—that is, in plan view of the plane defined by the first dimension D1 and the second dimension D2 as shown in FIG. 3. In particular, in some embodiments, each of the branching portions is a binary branch in which one path splits or branches into two paths.

A variety of different pattern determining techniques may be employed, including use of software simulations and/or various other techniques that may be used for patterning the waveguide paths so as to reduce side lobing and/or increase strength of the main lobe, for example. The waveguide paths, such as the distance the "U" portion of the waveguide path extends in the first dimension and/or other properties concerning the length of the waveguide paths, may be determined so as to achieve a particular delay at each edge emitter. Such a delay may be application specific and/or may be designed and/or developed using constraints selected by the designer or manufacturer.

In one embodiment, the waveguide pattern discussed above in connection with Eq. 1, Eq. 2, and associated algorithm may be used to determine the waveguide pattern based on selecting a number of waveguide paths N being predetermined and may be set according to the application in which the optical phased array is to be used.

For example, in some embodiments, spacing of the plurality of edge emitters is determined based on an aperiodic constant that varies amongst the plurality of edge emitters. The aperiodic constant for each edge emitter of one or more of these edge emitters is determined using a recursive function that incorporates the aperiodic constant for an adjacent edge emitter. The recursive function incorporates values from another iteration in order to generate the value, such as the recursive aperiodic pitch function discussed above. In other embodiments, other aperiodic symmetric edge emitter configurations may be used. The method 400 continues to step 430.

In step 430, a pattern layer having the waveguide pattern determined in step 420 is then fabricated onto the base layer of the pattern layer. The pattern layer, which may be the pattern layer 124 of the waveguide array 102, may be $Si_3N_4$ as discussed above. The pattern layer may be fabricated by forming a solid substrate layer and then etching the waveguide paths in the substrate according to the determined pattern. The method 400 continues to step 440.

In step 440, a top layer is formed on top of a pattern layer, which may be the previous or first pattern layer or may be a subsequent pattern layer, such as when constructing a three-dimensional (3D) optical phased array, for example. This top layer corresponds to the top layer 126 and may be a cladding layer or protection layer that, together with the base layer of the waveguide array, sandwich the pattern layer therebetween. Various techniques known in the art may be used for forming the top layer, which may be comprised of a Silicon-based substrate, such as $SiO_2$ having a refractive index of 1.45, for example. The method 400 then ends.

It will be appreciated that any suitable order may be used for the steps of the method 400, such as where step 420 is performed prior to step 410. The method 400 above may be used to form a two-dimensional (2D) optical phased array. In other embodiments, the method 400 may be used to form a 3D optical phased array, such as that which is shown in FIGS. 7-8. In such embodiments, for example and with reference also to FIG. 7, step 410 may include forming the first waveguide array $\mathbf{206}_1$ on the base substrate 204, step 430 may include fabricating the pattern layer $\mathbf{212}_1$ of the first waveguide array $\mathbf{206}_1$, and step 440 may include forming the top layer on top of the pattern layer $\mathbf{212}_N$ of the last waveguide array $\mathbf{206}_M$.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. An optical phased array device, comprising:

an optical phased array that generates a phased array output, wherein the optical phased array includes a common path branching into a plurality of waveguide paths that each terminates at a separate one of a plurality of edge emitters;

wherein the plurality of edge emitters are spaced apart from one another along a first axis, wherein the first axis extends in a first dimension along a common edge of the optical phased array, and wherein spacing of the plurality of emitters along the first axis is aperiodic; and wherein spacing of two or more of the plurality of edge emitters is determined based on an aperiodic constant that varies according to a recursive function that incorporates the aperiodic constant for an adjacent edge emitter.

2. The optical phased array device of claim 1, wherein the optical phased array device is a solid-state lidar device.

3. The optical phased array device of claim 2, wherein the phased array output is comprised of infrared or near-infrared electromagnetic radiation.

4. The optical phased array device of claim 1, wherein two or more of the plurality of waveguide paths are configured according to an omega shaped phase delay configuration.

5. The optical phased array device of claim 4, wherein each of the plurality of waveguide paths is configured according to the omega-shaped phase delay configuration.

6. The optical phased array device of claim 1, wherein the plurality of waveguide paths are disposed within a pattern layer having a pattern comprised of $Si_3N_4$.

7. The optical phased array device of claim 1, wherein the spacing for each of the plurality of emitters is symmetric about an axis extending in a second dimension orthogonal to the first dimension.

8. The optical phased array device of claim 7, wherein the plurality of waveguide paths are disposed in an optical phased array plane defined within the first dimension and the second dimension.

9. The optical phased array device of claim 1, wherein the aperiodic constant for the two or more edge emitters is determined based on both a first predetermined length of a first waveguide path of the plurality of waveguide paths and a second predetermined length of the first waveguide path of the plurality of waveguide paths, and wherein the first predetermined length of the first waveguide path and the second predetermined length of the first waveguide path each extends in the first dimension.

10. A method of manufacturing an optical phased array for an optical phased array device, comprising:

forming a base layer of a waveguide array on a base substrate;

determining a waveguide pattern defining a plurality of waveguide paths, wherein the plurality of waveguide paths branch from a common path and terminate at a plurality of edge emitters, wherein the plurality of edge emitters are spaced apart from one another along a first axis, wherein the first axis extends in a first dimension along an edge of the optical phased array, wherein spacing of two or more of the plurality of emitters along the first axis is aperiodic, wherein the spacing of the two or more of the plurality of edge emitters is determined based on an aperiodic constant that varies according to a recursive function that incorporates the aperiodic constant for an adjacent edge emitter, and wherein the plurality of waveguide paths include an omega shaped phase delay configuration; and fabricating a pattern layer of the waveguide array on top of the base layer of the waveguide array according to the determined waveguide pattern.

11. The method of claim 10, wherein the plurality of edge emitters are spaced along the first axis according to $ACn=ACn-1+n-1$, where ACn is the aperiodic constant for the nth edge emitter, and where an initial predetermined value is used for $ACn-1$ when $n=1$.

12. The method of claim 10, wherein a second axis extending in the first dimension and parallel to the first axis in a first dimension extends through a phase delay modulator portion of the plurality of waveguide paths, and wherein the waveguide paths are spaced aperiodically along the second axis.

13. The method of claim 10, wherein at least one of the plurality of waveguide paths includes a phase delay configuration in which the at least one waveguide path extends, when taken in a direction from a collector side extending to an emitter side, in the first dimension and then in a second dimension that is orthogonal to the first dimension.

14. A method of manufacturing an optical phased array for an optical phased array device, comprising:

forming a base layer of a waveguide array on a base substrate;

determining a waveguide pattern defining a plurality of waveguide paths, wherein the plurality of waveguide paths branch from a common path and terminate at a plurality of edge emitters, wherein the plurality of edge emitters are spaced apart from one another along a first axis, wherein the first axis extends in a first dimension along an edge of the optical phased array, wherein spacing of two or more of the plurality of edge emitters is determined based on an aperiodic constant that varies amongst the plurality of edge emitters, and wherein the aperiodic constant for at least one edge emitter of the plurality of edge emitters is determined using a recursive function that incorporates the aperiodic constant for an adjacent edge emitter; and fabricating a pattern layer of the waveguide array on top of the base layer of the waveguide array according to the determined waveguide pattern.

15. The method of claim 14, wherein the aperiodic constant for the two or more edge emitters is determined using the recursive function.

16. The method of claim 15, wherein the aperiodic constant for each of the two or more edge emitters is defined according to $ACn=ACn-1+n-1$, where ACn is an aperiodic constant for the nth edge emitter, and where an initial predetermined value is used for $ACn-1$ when $n=1$.

17. The method of claim 14, wherein the aperiodic constant for the at least one edge emitter is determined based on both a predetermined length of a first waveguide path of the plurality of waveguide paths and a predetermined length of a second waveguide path of the plurality of waveguide paths, wherein the predetermined length of the first waveguide path and the predetermined length of the second waveguide path each extends in the first dimension.

18. The method of claim 14, wherein the aperiodic constant for the at least one edge emitter is determined based on both a first predetermined length of a first waveguide path of the plurality of waveguide paths and a second predetermined length of the first waveguide path of the plurality of waveguide paths, and wherein the first predetermined length of the first waveguide path and the second predetermined length of the first waveguide path each extends in the first dimension.

19. The method of claim 18, wherein the plurality of waveguide paths include an omega shaped phase delay configuration where two or more waveguide paths of the plurality of waveguide paths each includes a first leg extending in a first direction within the first dimension and a second leg extending in a second direction within the first dimension, wherein the first predetermined length of the first waveguide path is a length of the first leg, and wherein the second predetermined length of the first waveguide path is a length of the second leg.

* * * * *